(12) United States Patent
Bode et al.

(10) Patent No.: US 12,130,171 B2
(45) Date of Patent: Oct. 29, 2024

(54) MONOLITHIC WEIGHING SYSTEM AND METHOD FOR PRODUCING SAME

(71) Applicant: SARTORIUS LAB INSTRUMENTS GMBH & CO. KG, Goettingen (DE)

(72) Inventors: Jonas Bode, Goettingen (DE); Matthias Geisler, Noerten-Hardenberg (DE)

(73) Assignee: SARTORIUS LAB INSTRUMENTS GMBH & CO. KG, Goettingen (DE)

(*) Notice: Subject to any disclaimer, the term of this patent is extended or adjusted under 35 U.S.C. 154(b) by 346 days.

(21) Appl. No.: 17/746,070

(22) Filed: May 17, 2022

(65) Prior Publication Data

US 2022/0276086 A1 Sep. 1, 2022

Related U.S. Application Data

(63) Continuation of application No. PCT/EP2020/081466, filed on Nov. 9, 2020.

(30) Foreign Application Priority Data

Nov. 18, 2019 (DE) .................. 10 2019 131 101.2

(51) Int. Cl.
*G01G 7/00* (2006.01)
*B22F 10/64* (2021.01)
(Continued)

(52) U.S. Cl.
CPC .............. *G01G 7/00* (2013.01); *B22F 10/64* (2021.01); *B22F 10/66* (2021.01);
(Continued)

(58) Field of Classification Search
CPC ........ G01G 7/00; G01G 21/244; B22F 10/64; B22F 10/66; B22F 2301/10;
(Continued)

(56) References Cited

U.S. PATENT DOCUMENTS 4,285,413 A 8/1981 Dauge et al.
4,597,460 A * 7/1986 Wernimont .............. G01G 3/14
177/1

(Continued)

FOREIGN PATENT DOCUMENTS

CN 88102671 A 12/1988
CN 103323089 A 9/2013
(Continued)

OTHER PUBLICATIONS

International Search Report, PCT/EP2020/081466, Jan. 21, 2021, 5 pages.

(Continued)

*Primary Examiner* — Jacques M Saint Surin
(74) *Attorney, Agent, or Firm* — Edell, Shapiro & Finnan, LLC

(57) ABSTRACT

A monolithic weighing system (100) includes a plurality of levers (120), which are joined together by thin-section joints (110). The levers, on the one hand, and the thin-section joints, on the other hand, are made of different materials or material combinations; and the levers, adjoining one of the thin-section joints on both sides thereof, have a first material (21), and the thin-section joint has a second material (22) which is different from the first material. An associated method includes (i) an additive manufacturing process, in which different materials, including the first and second material (21, 22), are applied in layers and are joined to form a single-piece weighing system blank (10), wherein the weighing system blank (10) has prospective lever regions (12) and prospective thin-section joint regions (11), and (ii) subsequent subtractive finishing of the weighing system blank at least on the prospective thin-section joint regions to obtain the weighing system.

13 Claims, 3 Drawing Sheets

(51) Int. Cl.
*B22F 10/66* (2021.01)
*B33Y 10/00* (2015.01)
*B33Y 40/20* (2020.01)
*B33Y 80/00* (2015.01)

(52) U.S. Cl.
CPC ..... *B22F 2301/052* (2013.01); *B22F 2301/10* (2013.01); *B22F 2301/15* (2013.01); *B22F 2998/10* (2013.01); *B33Y 10/00* (2014.12); *B33Y 40/20* (2020.01); *B33Y 80/00* (2014.12)

(58) Field of Classification Search
CPC ............. B22F 2301/15; B22F 2998/10; B22F 2301/052; G01L 1/2243; B33Y 10/00; B33Y 80/00; B33Y 40/20; Y02P 10/25
USPC .......................................................... 177/21
See application file for complete search history.

(56) References Cited

U.S. PATENT DOCUMENTS

| | | | |
|---|---|---|---|
| 4,799,561 A | 1/1989 | Komoto | |
| 9,116,032 B2 * | 8/2015 | Gottfriedsen | G01G 7/02 |
| 9,227,284 B2 * | 1/2016 | Itou | B23Q 11/0883 |
| 9,927,284 B2 | 3/2018 | Graf | |
| 10,036,766 B2 | 7/2018 | Graf et al. | |
| 11,892,342 B2 * | 2/2024 | Burisch | G01G 7/02 |
| 2017/0284857 A1 * | 10/2017 | Hauck | G01G 21/244 |
| 2020/0340849 A1 | 10/2020 | Burisch et al. | |

FOREIGN PATENT DOCUMENTS

| | | |
|---|---|---|
| CN | 105143838 A | 12/2015 |
| CN | 105431722 A | 3/2016 |
| DE | 102017218033 A1 | 4/2019 |
| EP | 0018919 A1 | 11/1980 |
| EP | 0449266 A2 | 10/1991 |
| EP | 3502633 A1 | 6/2019 |
| JP | 2018205141 A | 12/2018 |
| WO | 2019121350 A1 | 6/2019 |

OTHER PUBLICATIONS

Chinese Office Action, Application No. 202080078846.0, Jul. 16, 2024, including English translation, 13 pages.

* cited by examiner

MONOLITHIC WEIGHING SYSTEM AND METHOD FOR PRODUCING SAME

CROSS REFERENCE TO RELATED APPLICATIONS

This is a Continuation of International Application PCT/EP2020/081466, which has an international filing date of Nov. 9, 2020, and which claims the priority of German Patent Application 10 2019 131 101.2, filed Nov. 18, 2019. The disclosures of both applications are incorporated in their respective entireties into the present Continuation by reference.

FIELD OF THE INVENTION

The invention relates to a monolithic weighing system, comprising a plurality of levers, which are joined together by joints that are thinner than the levers (i.e., thin-section joints). The levers, on the one hand, and the thin-section joints, on the other hand, are made of different materials (i.e. mutually differing materials) or material combinations (i.e. mutually differing material combinations), wherein the levers, adjoining one of the thin-section joints on both sides, have a first material, and the thin-section joint has a second material that is different from the first material.

Furthermore, the invention relates to a method for producing a monolithic weighing system, comprising a plurality of levers, which are joined together by thin-section joints (i.e., joints that are thinner than the levers). The levers, on the one hand, and the thin-section joints, on the other hand, are made of different materials (i.e., mutually differing materials) or material combinations (i.e. mutually differing material combinations); and the levers, adjoining one of the thin-section joints on both sides, have a first material, and the thin-section joint has a second material that is different from the first material.

BACKGROUND

A weighing system of conventional type and a method for the production thereof are known from EP 3 502 633 A1 or WO 2019/121350 A1.

The term "weighing system" is understood here to mean the lever mechanism, which connects the load cell, on the one hand, for example, a weighing pan, to the actual sensor, on the other hand, for example, an electromagnetic moving coil arrangement, in balances, in particular, in electronic precision balances, independently of whether they work, for example, according to the principle of electromagnetic compensation or on the basis of strain gauges. For this purpose the weighing system comprises a complex arrangement of levers (including connecting rods) and joints, connecting them. These joints are joined together in one piece (in a monolithic manner). The typical method for producing such a monolithic weighing system, in short: "monolith", consists of milling the entire system out of a block of metal, for example, aluminum. This method is expensive, inter alia, in terms of the associated costs of the material. In addition, the aluminum that is often used is by no means the optimum material for all of the functional aspects. It is, however, a good compromise with respect to the necessary functional properties of the different components of the monolith and with respect to its machinability. If other materials are selected, the compromise is often less favorable. Although a monolithic weighing system, made of inexpensive stainless steel, would be easy to machine and also exhibits the necessary rigidity required in the region of the levers, the joints, in particular, thin-section joints, made of stainless steel, always lack the necessary elasticity and tensile strength. On the other hand, the choice, for example, of Inconel® would be better with respect to the joint properties, and the necessary condition of rigidity required for the lever would also be fulfilled. However, brittle Inconel can only be machined with considerable difficulty on a large scale. Therefore, it would be better to provide a monolith made of materials that are different, but joined together so that the materials are quasi uniform.

This approach is pursued in the aforementioned conventional document that proposes to manufacture a weighing system blank, which is made of a material that is optimized for the lever regions, and to provide recesses in the joint regions. Then the recesses are subsequently filled with a material that is optimized for the joint regions. According to this document, it is proposed that this material be filled in a material locking manner by casting, forming or kneading, and, in particular, in the case of kneading in such a manner that the material is quasi uniform. However, according to the experience of the present inventors, this approach is not very suitable in practice.

SUMMARY

An object of the present invention is to provide a weighing system and to provide a method for the production thereof, wherein said method comprises a practical implementation of the approach of selecting materials that are optimized for the functional regions.

According to one formulation of the claimed invention, the aforementioned object is achieved in that a monolith according to the present invention is produced by an additive manufacturing method, in which different materials, including the first and the second material, are applied in layers and are joined in order to form a single-piece weighing system blank, wherein the weighing system blank has prospective lever regions and prospective thin-section joint regions, and subsequent subtractive finishing of the weighing system blank at least on the prospective thin-section joint regions to obtain the weighing system.

A corresponding production method is characterized by a further formulation of the invention, which includes the following steps:

producing a weighing system blank by of an additive manufacturing method, in which powders, consisting of different materials, including the first and second material, are sintered in order to form the weighing system blank, wherein the weighing system blank has prospective lever regions and prospective thin-section joint regions, and subsequent subtractive finishing of the weighing system blank at least on the prospective thin-section joint regions to complete the weighing system.

Preferred embodiments are the subject matter of the dependent claims.

An underlying aspect of the approach of the present invention is first, stated in simple terms, to "print" the blank of a monolithic weighing system with a "3D printer". A person who is skilled in the art under discussion is aware of the various approaches to 3D printing (synonymous with additive manufacturing method), all of which can be used within the scope of the present invention. Some examples, which are mentioned here solely for illustrative purposes, include the so-called cold spray method, selective laser welding, deposition welding and powder sintering. In the case of powder sintering, in particular, the powder bed laser sintering process and the powder-jet laser sintering process have proven to be particularly suitable. The advantage of such additive manufacturing methods is that defined regions of the weighing system blank can be produced respectively from different materials solely by feeding in the different powders, in particular, the different metal powders, in a properly synchronized manner. Depending on the design of the transitions, it is possible to create, when changing the powder, sharp material boundaries or mutually penetrating transition regions. In any case the individual functional regions of the monolith can be produced from the respective materials that are selected so as to be functionally optimal in each case for this purpose.

Another advantage of the additive manufacturing methods lies in the greater geometrical design freedom, as compared to the subtractive process. In particular, undercuts or cavities, which cannot be produced or can only be produced with difficulty by subtractive methods, can be made comparatively easily by additive methods.

The disadvantage with respect to conventional milling is that the spatial precision of the additive manufacturing methods is still insufficient to date. Therefore, the invention provides a subtractive, i.e., material removing, post-processing in a second step of the method. This subtractive post-processing relates, in particular, to the prospective thin-section joint regions of the weighing system blank, i.e., those regions of the weighing system blank, from which the thin-section joints of the weighing system are formed during the final machining process. The prospective lever regions, i.e., those regions of the weighing system blank, from which the levers of the weighing system are formed during the final machining process, are typically subjected to subtractive post-processing. However, this subtractive post-processing can often be limited to deburring or polishing. During the subtractive finishing process, a substantial change in shape typically takes place in the prospective thin-section joint regions.

Therefore, it is possible, for example, to make the prospective lever regions from stainless steel and the prospective thin-section joint regions from a corrosion-resistant nickel-based alloy, for example, Inconel®. Thereby, the associated disadvantage of the high price and poor machinability of Inconel is limited to small areas of the overall apparatus and, in addition, is overcompensated by the functional optimization. On the other hand, the advantage of the low price of stainless steel and the ease, with which stainless steel can be post-processed, can be utilized in the bulk of the monolith, where its functional properties also correspond to the desired requirements.

The subtractive finishing process can be carried out in a manner known per se, in each case in consideration of the requirements of the individual case. For example, this subtractive finishing process can be carried out mechanically, in particular, by milling, laser optically or by electrical discharge machining.

Some monolith geometries have highly filigree thin-section joints. If brittle materials are selected for these regions, for example, Inconel®, then these regions are quite sensitive and, in particular, at risk of fracturing in a rough manufacturing environment. Despite the subtractive finishing process, proposed in accordance with the present invention, it is not always possible to design the prospective thin-section joint regions to be solid so that they are reliably protected against fracturing during the subsequent machining steps before the finishing process. Therefore, in one particular embodiment of the invention, it is provided that one of the prospective thin-section joint regions (preferably all) and the prospective lever regions, adjoining it on both sides, have two outer layers of the first material and, lying therebetween, an inner layer of the second material. During the final machining process the outer layers in the prospective thin-section joint region are completely removed while at least partially retaining the inner layer there and while at least partially retaining the inner and outer layers in the adjoining prospective lever regions. In other words, the weighing system blank is printed (additively manufactured) in a cross-regional sandwich mode of construction. In this case the second material, which is optimized specifically for the joint function, is introduced as an inner layer, which is flanked by two outer layers of the first material, which is optimized for the lever function. This outer jacket stabilizes the prospective thin-section joint region during the entire production and handling process up to the final machining process. Not until the final machining process are these outer stabilizing layers removed in the prospective thin-section joint region. What remains is the inner layer that is mechanically sensitive, but is optimized for the joint function and that then forms the thin-section joint in the finished monolith. At the same time this inner layer protrudes deep into the adjacent levers and, in so doing, is firmly anchored in the adjoining structures within the monolith.

As an alternative, it can be provided that the levers, adjoining a thin-section joint on both sides, consist mainly of the first material and that the thin-section joint consists entirely of the second material, which gradually merges into the first material in the transition regions, lying within the levers. In this embodiment the prospective thin-section joint region is preferably already printed exclusively from the second material that is optimized for the joint function. The anchoring in the adjoining prospective lever regions takes place by forming corresponding transition regions, which can be realized, for example, by blending the infeeds of both materials during the additive manufacturing process. In this embodiment the subtractive post-processing is less complex. However, the prospective thin-section joint region is completely unprotected, for which reason this embodiment does not come into consideration for all materials.

Moreover, it is possible to design different prospective thin-section joint regions of the weighing system blank in different ways, so that different thin-section joint structures can be realized within the same monolith.

As already mentioned above, various combinations of materials have proven particularly suitable. Thus, it can be advantageously provided that the first and the second material are metallic materials, with the first material being, in particular, stainless steel and the second material being, in particular, Inconel®. As an alternative, the first material can be, in particular, a copper-nickel-tin alloy; and the second material can be, in particular, a copper-beryllium alloy. The material combinations, which are mentioned here, are to serve merely as examples and are not intended to limit the scope of protection for the invention in any way.

Therefore, in another embodiment it can be provided that the first material is a ceramic, in particular, zirconium oxide or aluminum oxide; and the second material is a metallic material. Especially the aforementioned ceramics have proven to be highly suitable for additive manufacturing methods. It has also been found that in the case of such additive manufacturing methods with metallic materials, these ceramics can form very strong bonds, consisting of a quasi uniform material, through dissimilar regions that merge into one another. In addition, they have the rigidity required for the levers of the monolith and are extremely cost effective. However, they are completely unsuitable for the joints, for which reason metal, in particular, Inconel® or a copper-beryllium alloy, is preferably used here as the second material.

An additional advantage of ceramic materials lies in their electrically insulating property. Thus, in a further development of the above described embodiment, in which the first material and the second material are in each case metallic materials, it may be provided that the levers, adjoining one of the thin-section joints on both sides, comprise an electrical conductor track made of the second material. This electrical conductor track passes through the levers, is connected to the second material of the thin-section joint in such a manner that the material is uniform and is surrounded by the first material. Thereby, a conductor track, which runs through the levers and the thin section, lying therebetween, can be realized. This conductor track can be used to convey measurement signals or control signals or also to supply electrical energy. At least in the region of the levers the conductor track is insulated from its surroundings by the ceramic jacket surrounding it.

Further details and advantages of the invention will become apparent from the following description of exemplary embodiments and the drawings.

DETAILED DESCRIPTION

Figure 1:
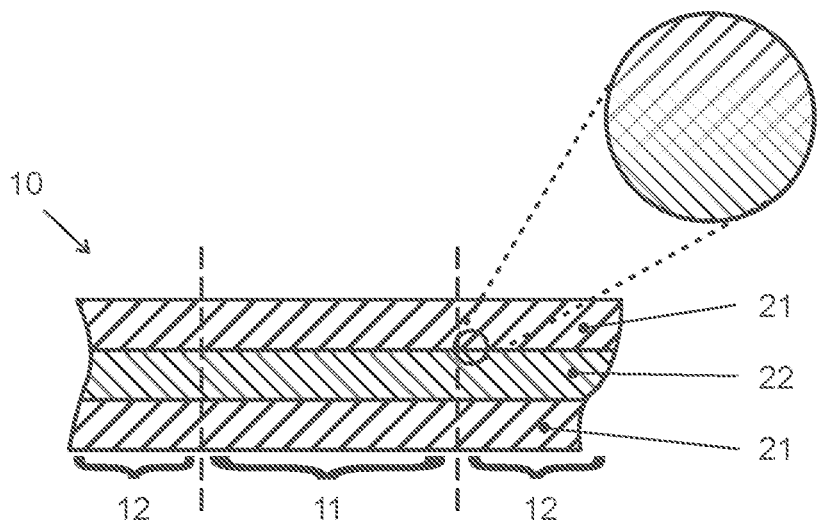
FIG. 1 a detail of a sectional view of a weighing system blank according to a first embodiment of the invention, FIGS. 2A and 2B an analogous detail of a sectional view of a weighing system, resulting from the weighing system blank from FIG. 1, after mechanical finishing (FIG. 2A) or laser-optical finishing (FIG. 2B), FIG. 3 a detail of a sectional view of a weighing system blank according to a second embodiment of the invention, FIGS. 4A and 4B an analogous detail of a sectional view of a weighing system, resulting from the weighing system blank from FIG. 3, after mechanical finishing (FIG. 4A) or laser-optical finishing (FIG. 4B), FIG. 5 a detail of a sectional view of a weighing system blank according to a third embodiment of the invention, FIG. 6 a perspective view of a weighing system according to a preferred further development of the invention, and FIG. 7 a sectional view of the weighing system from FIG. 6.

Identical reference numerals in the figures denote the same or analogous elements.

Figure 2A:
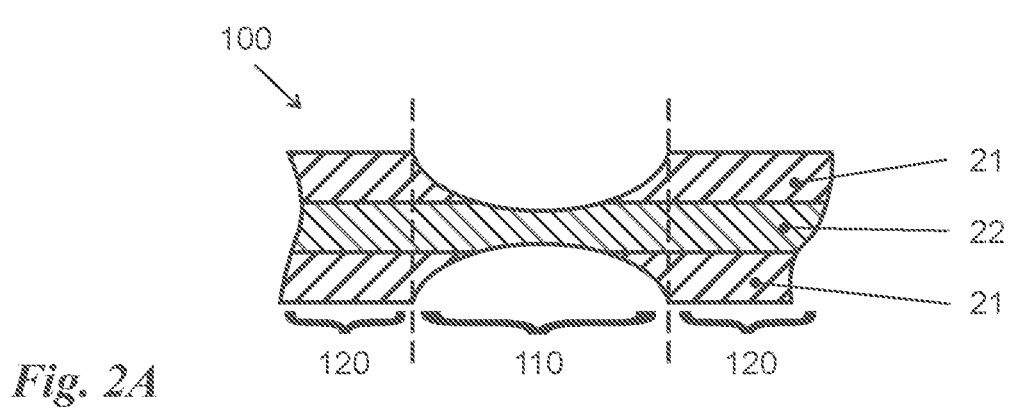
Figure 2B:
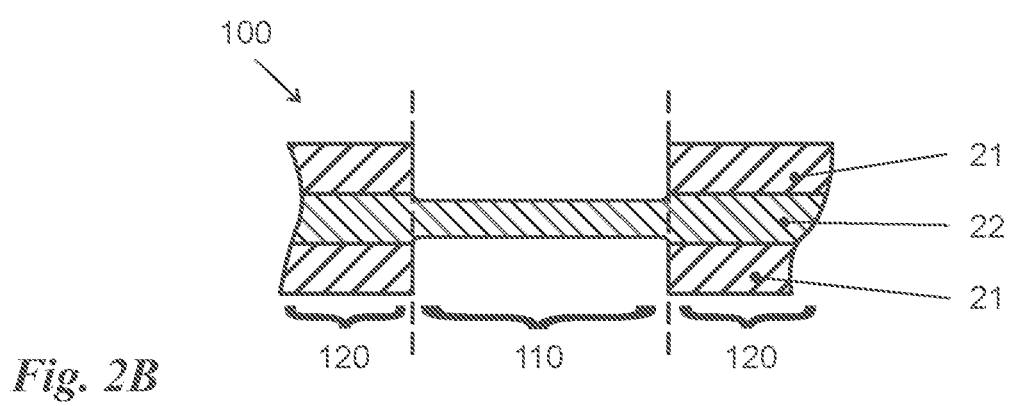
Figure 3:
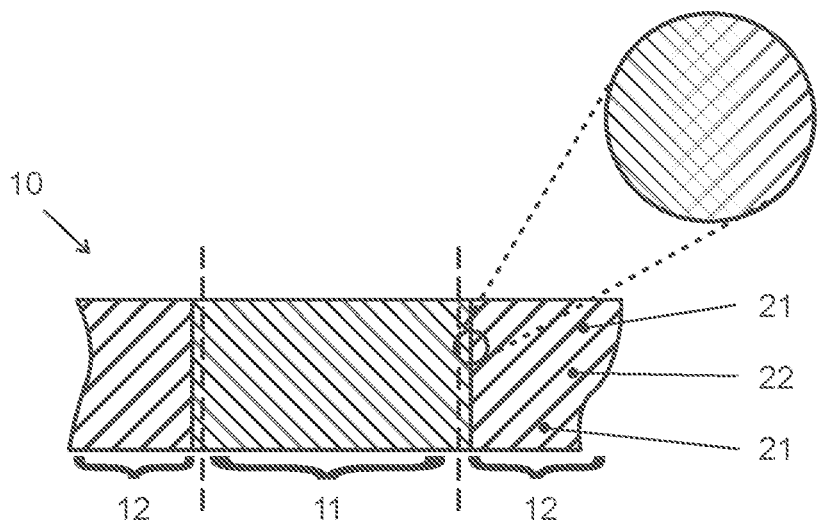

In accordance with a production method according to the present invention, a weighing system blank 10 is first produced through an additive manufacturing method. In this case different materials or different combinations of materials are used for different regions of the weighing system blank 10. Then the weighing system blank 10 is subsequently subjected to a subtractive finishing process, which results in the production of a finished weighing system 100. FIGS. 1 and 3 show in a significantly simplified representation illustrative details of weighing system blanks 10 that are constructed in different ways. FIGS. 2A, 2B, 4A, and 4B show the weighing systems 100, which can be produced from the weighing system blanks 10, shown in FIGS. 1 and 3, by different finishing techniques. Shown in each case is a detail of the weighing system blank 10 or the weighing system 100, which comprises a prospective thin-section joint region 11 or a thin-section joint 110 as well as the respective prospective lever regions 12 or levers 120, adjoining on both sides. In this case only the end region, which directly adjoins the prospective thin-section joint region 11 or the thin-section joint 110, is shown by the prospective lever regions 12 or the levers 120.

In the weighing system blank 10 from FIG. 1, a sandwich-like layer structure was realized. An inner layer, made of a second material 22, is embedded between two outer layers, made of a first material 21. The first material 21, for example, stainless steel or a copper-nickel-zinc alloy, is selected such that it is optimized for the design of the levers 120 of the weighing system 100. In particular, it should be stable, creep resistant, cost effective and preferably easily machinable. On the other hand, the second material 22, for example, Inconel® or a copper-beryllium alloy, is selected such that it is optimized for the design of the thin-section joint 110. In particular, the desired spring properties in each individual case have the highest priority in the selection of materials here. A person skilled in the art under discussion will understand that FIG. 1 is not intended to be true to scale with respect to the relative layer thickness of the materials 21, 22. In particular, in practice the outer layers, made of the first material 21, are generally much thicker than the inner layer, made of the second material 22.

The enlarged circle, shown at the top right in FIG. 1, illustrates a special feature of the additive manufacturing method. A successive blending of the starting powders, which consist of the materials 21, 22 and are used to construct the weighing system blank 10, allows a transition region to be created between the layers. In this transition region the materials 21, 22 permeate each other and, in spite of the different starting materials, form a structure consisting of a quasi uniform material. Depending on the selected synchronization of the infeed and application of the powder during the additive manufacturing process, the thickness and the material gradients in this transition region can be precisely set.

Then, according to the invention, the weighing system blank 10 is subjected to a final machining process, in which, in particular, the prospective thin-section joint regions 11 are reworked into thin-section joints 110. According to the invention, this process is carried out through a subtractive machining method, i.e., by removing material. Even the prospective lever regions 12 undergo reworking in order to form the levers 120.

The final machining process can be carried out in different forms. FIG. 2A shows the result of a typical finishing process by milling. FIG. 2B shows the result of a typical laser-optical finishing process. Other subtractive machining methods, such as, for example, electrical discharge machining, can also be used within the scope of the present invention.

FIG. 3 shows an alternative embodiment of a weighing system blank 10. In the case of the additive production of the weighing system blank 10 from FIG. 3, the different materials 21, 22 were not applied alternatingly in layers, but rather in sections. Here, too, the result is, as shown in the enlarged circle at the top right in FIG. 3, a transition, in which the material is quasi uniform and which ensures that the different material regions are firmly anchored in each other. In the embodiment from FIG. 3, the prospective lever regions 12 were produced almost entirely from the first material 21; and the prospective thin-section joint region 11, from the second material 22. However, in the illustrated preferred embodiment the transition region between the materials 21, 22 has been clearly moved into the prospective lever regions 12. As a result, the prospective thin-section joint region 11 does, in fact, consist exclusively of the second material 22 that is optimized for the joint function. The "impurity" in the material that is represented by the transition region and that could have a disadvantageous effect on the joint function if this impurity were positioned in the finished thin-section joint 110, is of no consequence in the region of the levers 120, which have to be substantially stable, in particular, rigid.

Figure 4A:
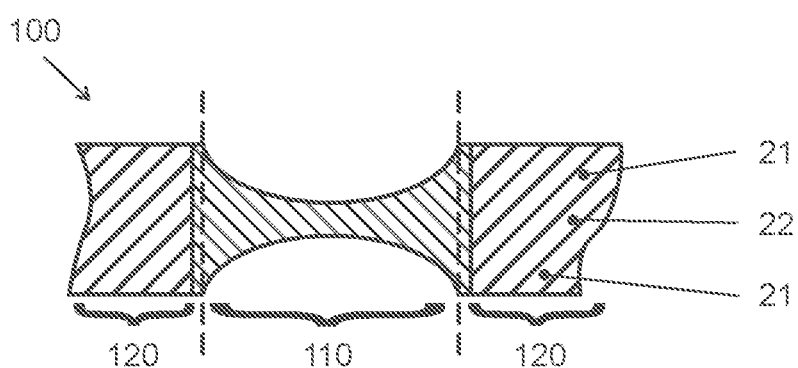
Figure 4B:
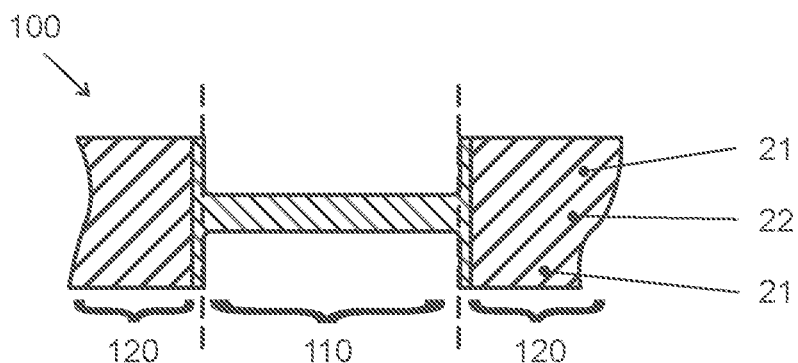

With respect to FIGS. 4A and 4B, which show different variants of the finishing process according to the invention, specifically, in particular, finishing by milling (FIG. 4A) and laser-optical finishing (FIG. 4B), reference can be made to what has been said above in the context of FIGS. 2A and 2B.

Figure 5:
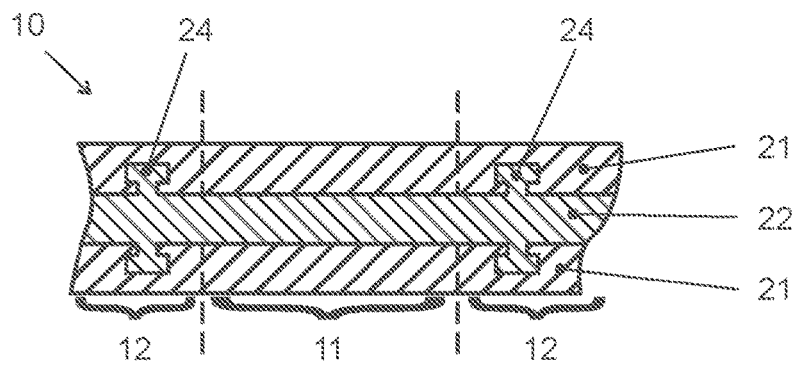

FIG. 5 shows an alternative embodiment of a weighing system blank 10 of the present invention to the above described anchoring of the material layers with continuous material transitions. In this case the boundary regions between the layers of the first material 21 and the second material 22 are designed as sharp separating surfaces, wherein the inner layer of the second material 22 has anchoring elements 24, which are undercut in a mushroom-like manner. These anchoring elements project into the adjacent layers and are surrounded there in a form-fitting manner by the first material 21. Such anchoring elements 24 can be provided distributed over the entire interface in order to ensure a permanently tight connection between the individual material layers.

Figure 6:
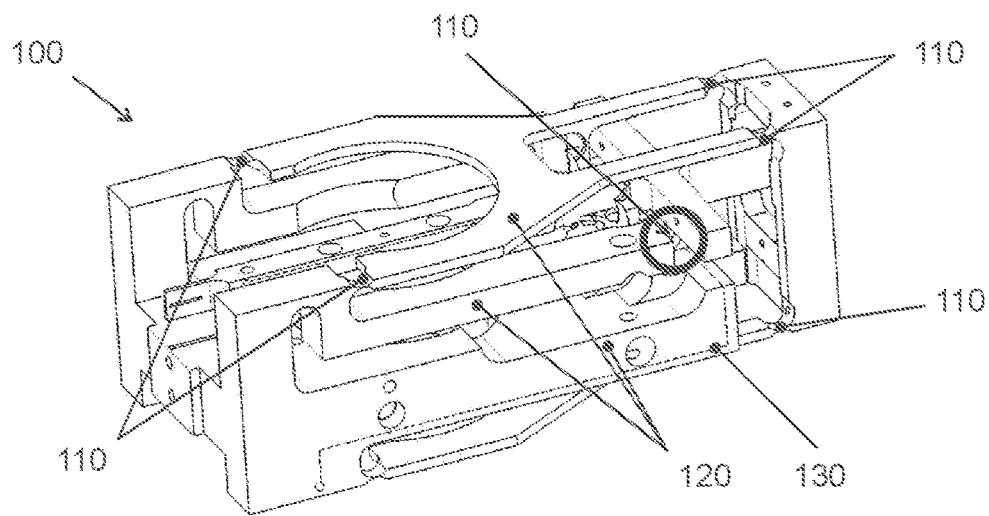
Figure 7:
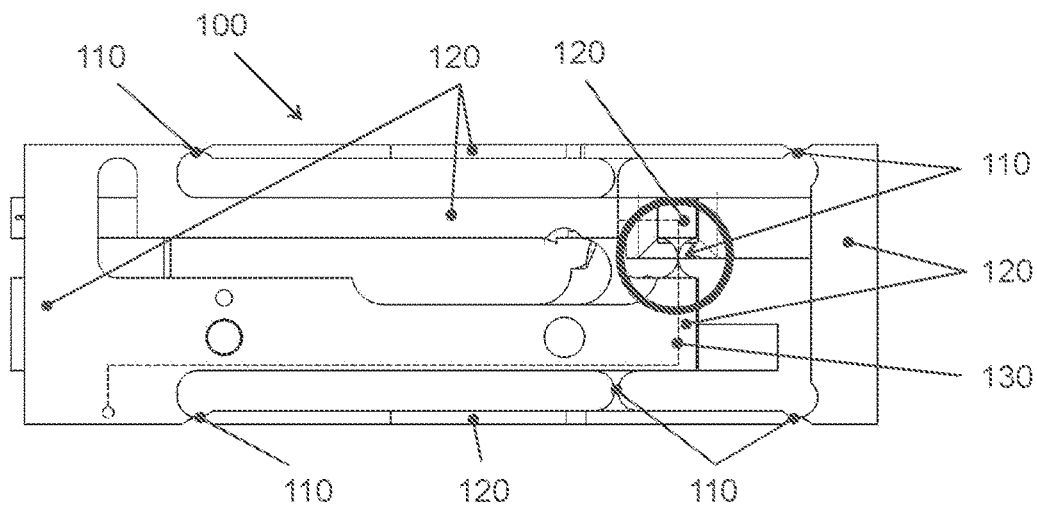

FIGS. 6 and 7 show different views of a further development of the present invention, in which the levers 120, adjoining the thin-section joint 110 that is denoted by a circle drawn in bold, are made substantially of ceramic material. However, they have a continuous web of metallic material, from which the thin-section joint 110 is also made in essence. Thereby, a conductor track 130 (dashed line in FIG. 6), which extends in almost any form through the weighing system, is realized. This conductor track 130 can be used to conduct measuring or control currents in an insulated manner (at least in the region of the levers 120) or to supply energy to specific components.

The embodiments, discussed in the specific description and shown in the figures, constitute exemplary embodiments of the present invention that are shown solely for illustrative purposes. In light of the present disclosure, a person skilled in the art is given a broad range of possible variations. In particular, the invention is not limited to the use of exactly two different materials 21, 22. It is, of course, also possible to use three or more different materials in different spatial constellations. The invention is also not limited to the use of metallic materials. In particular, the use of ceramics, especially for the prospective lever regions 12 or the levers 120, has proven to be particularly suitable. It will also be understood by a person skilled in the art that different regions of one and the same weighing system blank 10 can be designed in different forms, for example, according to the exemplary embodiments shown in FIGS. 1 and 3, so that different thin-section joints 110 or levers 120, adjoining them, can be realized in one and the same weighing system 100.

LIST OF REFERENCE NUMERALS 10 weighing system blank
11 thin-section joint region
12 lever region
21 first material
22 second material
100 weighing system
110 thin-section joint
120 lever

What is claimed is:

1. Monolithic weighing system, comprising:
a plurality of levers, and
a plurality of thin section joints,
wherein the levers are joined together by the thin-section joints, wherein the levers, on the one hand, and the thin-section joints, on the other hand, are made of different materials or of different material combinations; and
wherein the levers adjoining at least a respective one of the thin-section joints on both sides thereof comprise a first material, and wherein the thin-section joint comprises a second material, which is different from the first material, wherein the monolithic weighing system is formed from a single-piece weighing system blank comprising different materials, produced from an additive manufacturing method, in which the different materials, including the first material and the second material, are applied in layers and are joined, to form the single-piece weighing system blank, wherein the weighing system blank has prospective lever regions and prospective thin-section joint regions, and wherein the single-piece weighing system blank is subjected to a subtractive finishing of the weighing system blank at least on the prospective thin-section joint regions, to produce the weighing system.

2. Monolithic weighing system, as claimed in claim 1, wherein the subtractive finishing is carried out mechanically.

3. Monolithic weighing system, as claimed in claim 2, wherein the subtractive finishing is carried out by milling.

4. Monolithic weighing system, as claimed in claim 1, wherein the subtractive finishing is carried out laser-optically.

5. Monolithic weighing system, as claimed in claim 1, wherein the subtractive finishing is carried out by electrical discharge machining.

6. Monolithic weighing system, as claimed in claim 1, wherein one of the prospective thin-section joint regions and ones of the prospective lever regions adjoining the prospective thin-section joint region on both sides thereof, have two outer layers of the first material and, lying therebetween, an inner layer of the second material; and
wherein, during a final machining process, the outer layers in the prospective thin-section joint region are completely removed while the inner layer is at least partially retained in the prospective thin-section joint region, and both the inner and the outer layers are at least partially retained in the adjoining prospective lever regions.

7. Monolithic weighing system, as claimed in claim 1, wherein the levers adjoining at least one of the thin-section joints on both sides thereof consist mainly of the first material; and the thin-section joint consists entirely of the second material, which merges into the first material in transition regions, lying within the levers.

8. Monolithic weighing system, as claimed in claim 1, wherein the first material and the second material are metallic materials;
or wherein the first material is a copper-nickel-tin alloy and the second material s Inconel®.

9. Monolithic weighing system, as claimed in claim 8, wherein the first material is stainless steel, and the second material is a corrosion-resistant nickel-based alloy.

10. Monolithic weighing system, as claimed in claim 1, wherein the first material is a ceramic, and the second material is a metallic material.

11. Monolithic weighing system, as claimed in claim 10, wherein the first material is zirconium oxide or aluminum oxide.

12. Monolithic weighing system, as claimed in claim 10, wherein the levers, adjoining at least a respective one of the thin-section joints on both sides thereof, comprise an electrical conductor track made of the second material, and wherein the conductor track passes through the levers, is connected to the second material of the thin-section joint in a material uniform manner, and is surrounded by the first material.

13. Method for producing a monolithic weighing system that comprises a plurality of levers, which are joined together by thin-section joints, wherein the levers, on the one hand, and the thin-section joints, on the other hand, are made of different materials or of different material combinations, and the levers, adjoining at least a respective one of the thin-section joints on both sides thereof, comprise a first material, and wherein the thin-section joint comprises a second material, which is different from the first material, comprising:

producing a weighing system blank by an additive manufacturing process, in which respective powders, consisting of different materials, including the first material and the second material, respectively, are sintered to form the weighing system blank, wherein the weighing system blank has prospective lever regions and prospective thin-section joint regions, and after the additive manufacturing process, performing a subtractive finishing of the weighing system blank at least on the prospective thin-section joint regions.

* * * * *